United States Patent [19]
Vu

[11] Patent Number: 5,472,385
[45] Date of Patent: Dec. 5, 1995

[54] DIFFERENTIAL

[75] Inventor: Thomas H. Vu, Mocksville, N.C.

[73] Assignee: Clark Equipment Company, South Bend, Ind.

[21] Appl. No.: 27,419

[22] Filed: Mar. 9, 1993

[51] Int. Cl.[6] .................................................. F16H 48/10
[52] U.S. Cl. ............................................ 475/251; 475/249
[58] Field of Search ...................................... 475/220, 248, 475/249, 251

[56] References Cited

U.S. PATENT DOCUMENTS

| | | |
|---|---|---|
| 1,262,759 | 4/1918 | Dray . |
| 1,314,568 | 9/1919 | Brush . |
| 1,361,731 | 12/1920 | Jayne . |
| 1,399,045 | 12/1921 | Bernstein ............................ 475/248 |
| 1,493,175 | 5/1924 | Wolf ................................... 475/220 |
| 1,556,101 | 10/1925 | Goodhart ............................ 475/249 |
| 2,270,567 | 4/1940 | Slider . |
| 2,574,986 | 11/1951 | Schou . |
| 2,775,142 | 12/1956 | Brensike et al. . |
| 3,344,687 | 10/1967 | Stockton . |
| 3,375,736 | 4/1968 | Saari ................................... 475/249 |
| 4,004,471 | 1/1977 | Keske .................................. 475/251 |
| 5,037,362 | 8/1991 | Teraoka et al. ..................... 475/249 |

FOREIGN PATENT DOCUMENTS

WO92/01877  2/1992  WIPO ................................ 475/251

OTHER PUBLICATIONS

Excerpt from the "Handbook of Practical Gear Design" pp. 1.40, 1.41, 3.58–3.63, published in 1954.

*Primary Examiner*—Michael Koczo
*Attorney, Agent, or Firm*—Watts, Hoffmann, Fisher & Heinke Co.

[57] ABSTRACT

A differential mechanism usable as an inter-axle differential or as a conventional axle differential includes a carrier mounted for rotation in a differential housing. The carrier rotatably mounts a pair of face-type side gears located in a spaced apart, confronting relationship. A plurality of spur-type pinion gears are rotatably mounted within said carrier; the spur-type pinion gears are in meshing co-engagement with the confronting side gears and have radial axes of rotation with respect to the rotational axis of said carrier. Thrust/friction washers are disposed between the carrier and each face gear and provided limited slip capability to the differential. The differential can easily accommodate variations in torque split by installing unequally sized side gears. Changing the side gears does not require changing the size of the pinion gears to achieve other than 50/50 torque split between axles that are connected to the carrier.

8 Claims, 5 Drawing Sheets

DIFFERENTIAL

TECHNICAL FIELD

The present invention relates generally to gear assemblies, and in particular to differential gearing that utilizes a pair of face gears to split torque between an input shaft and two output shafts.

BACKGROUND ART

Differential gearing is well known and is used in many applications. Differentials are most commonly used in vehicle drive trains, and depending on the vehicle, are used to split torque between front and rear axle assemblies and/or left and right drive axles. When a differential is used to split torque between front and rear axle assemblies, it is normally termed an "interaxle differential." An inter-axle differential is normally connected to the front and rear axles by respective front and rear drive shafts.

In general, a differential includes a differential carrier which rotatably mounts confronting side gears which are connected to left and right vehicle axles when the differential forms part of an axle assembly or to front and rear drive shafts when used as an inter-axle differential. Two or more pinion gears are normally disposed between the confronting side gears and rotate on shafts that are carried by the carrier. A ring gear attached to the carrier is driven by an input pinion or input drive gear which produces rotation in the carrier and hence, an orbit-like motion in the pinion gears. As is well known, the motion of the carrier produces rotation in the side gears which, in turn, drive either left and right axles or front and rear drive shafts, depending on the application.

As is also well known in the art, a differential splits the input torque transmitted to the carrier (by the input pinion or input drive gear) between the left and rear axles or front and rear drive shafts, again depending on the application. If the side gears have equal numbers of gear teeth, the torque split is 50/50. For drive axle applications, a 50/50 torque split is generally desirable. However, in inter-axle applications, it is often desirable to have an unequal torque-split between front and rear drive axles. For example, in heavy off-road equipment, a 40/60 torque split between front and rear axles may be desirable. To achieve an unequal torque split, the side gears must have an unequal number of teeth, the ratio of the numbers of teeth on the side gears being directly proportional to the torque split that will be produced by the differential.

Currently, the most popular differential construction includes bevel side gears and associated bevel gear pinions. The use of bevel gears results in a durable and cost-effective differential. By virtue of its gear teeth configuration, a bevel gear differential cannot easily accommodate dissimilar side gears. In general, the side gears must be equally sized and include the same number of teeth in order for the beveled gear differential to operate properly. As a result, bevel gear differentials cannot normally produce an unequal torque split.

Differentials that use gears other than bevel gears have been suggested in the prior art. For example, U.S. Pat. Nos. 2,270,567 and 3,344,687 illustrate axle differentials that employ face-type side gears. When face-type side gears are used, the pinion gears carried by the differential carrier are usually configured as spur gears. U.S. Pat. No. 1,262,759 illustrates a differential gear that employs unequal face gears which are driven by two dissimilar pinion gears. The differentials suggested in these prior patents do not readily lend themselves to changes in the torque split produced by the side gears.

DISCLOSURE OF THE INVENTION

The present invention provides a new and improved differential which can be used either as an inter-axle differential for splitting torque between front and rear axles or as an axle differential for splitting torque between left and right drive axles. The disclosed differential includes spaced apart, confronting, face-type side gears rotatably mounted within a differential carrier and a plurality of pinion gears which are rotatably carried by the carrier and which co-engage the confronting side gears. In the preferred embodiment, the pinion gears define spur-type gear teeth which are in a co-meshing relationship with the spaced apart side gears.

According to a feature of the invention, thrust bearings preferably in the form of thrust washers are disposed between the side gears and the carrier and are operative to support thrust loads created by gear reaction forces generated between the pinion gears and the side gears, during differentiation. According to a further aspect of this feature, the thrust bearings can comprise friction discs which are operative to transfer torque between the side gears and the differential carrier to provide limited slip capability.

In the preferred and illustrated embodiment, the differential mechanism also includes a face-type ring gear which is operatively driven by a pinion gear rotatably supported in a pinion housing forming part of the differential. According to a preferred embodiment of this feature, an adaptor arrangement is provided which includes an adaptor member replaceably mounted within the pinion housing and which defines a rotational axis for the input pinion gear. The gear ratio between the pinion and ring gears can be easily changed by replacing the adaptor components which change the position of the rotational axis allowing a differently sized input pinion gear to be mounted within the same pinion housing. In this preferred embodiment, changeable bearing caps are also provided which also define an axis of rotation for the input pinion gear. The bearing cap is also replaced with one of an alternate configuration to provide a change in the rotational axis of the pinion gear thereby cooperating with the adaptor member in order to mount a differently sized pinion gear within the same pinion housing. Changing the input pinion gear changes the overall gear ratio of the differential.

According to another feature of the invention, the side gears are easily replaceable and may have equal or differently sized diameters to provide equal or unequal torque splits between the axles. Since the side gears define face-type gear teeth, only the side gears need to be changed to alter the torque split between the axles driven by the side gears. The pinion gears need not be changed.

According to the invention, the disclosed differential carrier can accommodate various numbers of pinion gears. In the illustrated carrier, up to six pinion gears can be mounted. However, the same differential carrier can be assembled with only two pinion gears if the torque requirements do not require the additional pinion gears.

Additional features will become apparent and a fuller understanding obtained by reading the following detailed description made in connection with the accompanying drawings.

BEST MODE FOR CARRYING OUT THE INVENTION

Figure 1:
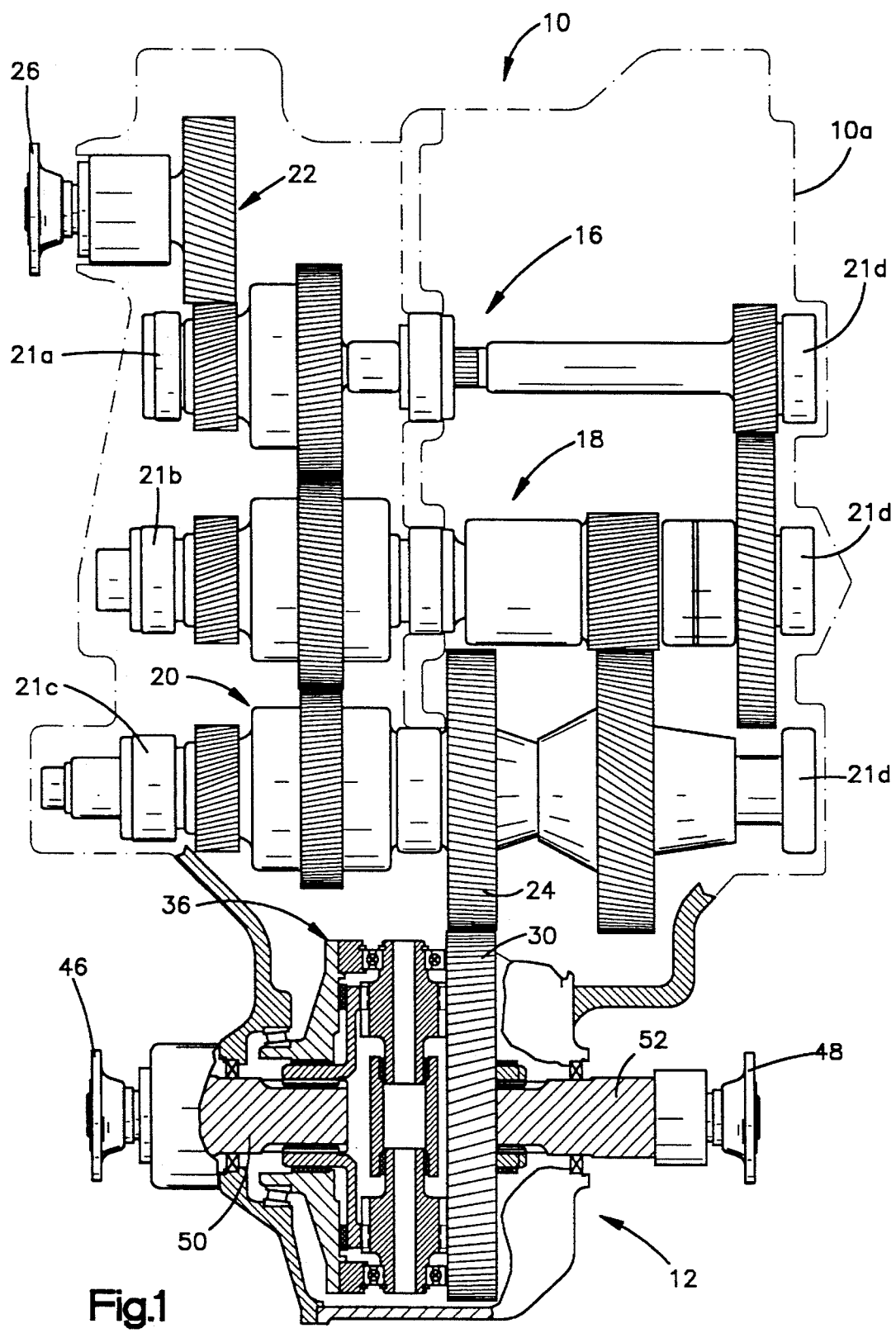
FIG. 1 is a view of a multispeed transmission shown somewhat schematically, which includes an interaxle differential constructed in accordance with the preferred embodiment of the present invention.

FIG. 1 illustrates a multispeed, power shift transmission, indicated generally by the reference character 10 which mounts an inter-axle differential, indicated generally by the reference character 12 near the bottom of a transmission gear case 10a. The illustrated transmission does not form part of the present invention and is being described for illustrative purposes only. The invention is not limited to the type of transmission illustrated and described.

As seen in FIG. 1, the transmission includes a plurality of gear shafts 16, 18, 20. Each shaft is rotatably supported in the transmission case 10a by bearings 21a–d. Each shaft includes gears and clutch mechanisms that are selectively energized to produce a given gear ratio. The gear ratio selected determines the ratio of revolutions between an input gear 22 to an output gear 24.

The input gear 22 is generally directly driven by a vehicle engine to which it is connected via a flanged coupling 26. The output gear 24, in the illustrated embodiment, is in meshing engagement with a ring gear 30 forming part of the inter-axle differential 12. The output and ring gears 24, 30 are illustrated as helical gears, but it should be understood that other gear types may be employed.

Figure 2:
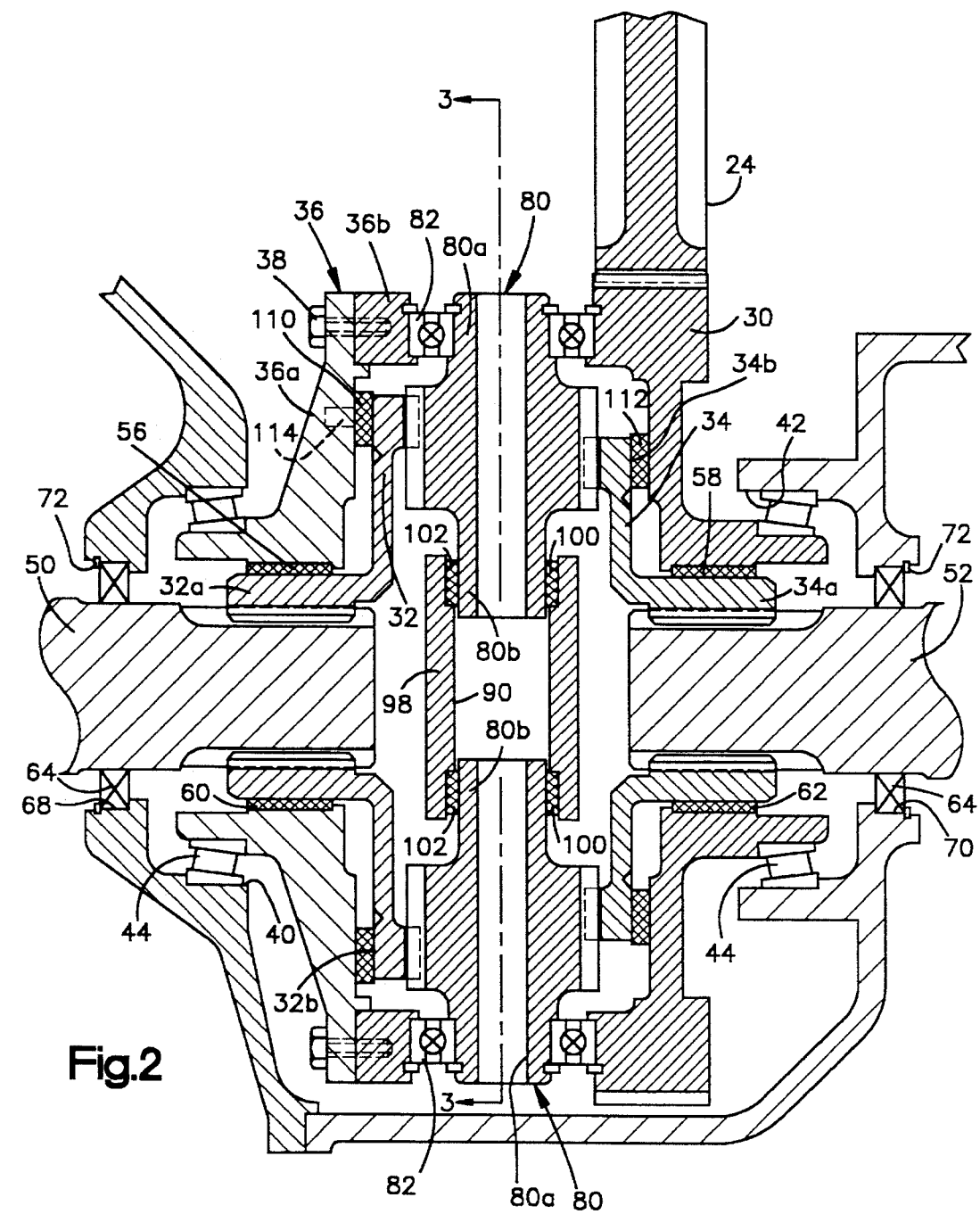
FIG. 2 is an enlarged fragmentary, cross-sectional view of the inter-axle differential shown in FIG. 1.

Referring also to FIG. 2, the inter-axle differential 12 includes a pair of side gears 32, 34 which are rotatably supported by a carrier 36. In the illustrated embodiment, the ring gear 30 forms part of the carrier 36. It should be understood, however, that the ring gear may be a separate component attached to the carrier by suitable fasteners. In the preferred construction, the carrier comprises a two piece construction and includes a carrier cap 36a secured to a main body 36b by a plurality of bolts 38.

The carrier 36 is rotatably supported in a bottom portion of the transmission case 10a. In particular, the case 10a includes a pair of spaced apart, aligned circular recesses 40, 42 which mount roller bearings 44 that, in turn, rotatably support the carrier 36. Front and rear drive shafts of the vehicle (not shown) are connected to respective drive flanges 46, 48, which are connected to stub shafts 50, 52. The inner ends of the stub shafts are externally splined and are received by internal splines formed in hubs 32a, 34a of the side gears 32, 34 so that rotation of the side gears produces attendant rotation in the stub shafts and hence, the front and rear drive axles. The hubs 32a, 34a of the side gears 32, 34 are rotatably supported by sleeve bearings 56, 58 which are carried in respective bores 60, 62 formed in the carrier 36. The stub shafts 50, 52 are rotatably supported by bearing assemblies 64 which are carried in circular, shouldered recessed 68, 70 formed in the transmission case 10a and held in position by snap rings 72. As is conventional, oil seals (not shown) are located next to the outboard sides of the bearing assemblies 64 and inhibit fluid leakage out of the differential/transmission housing 10a.

Figure 3:
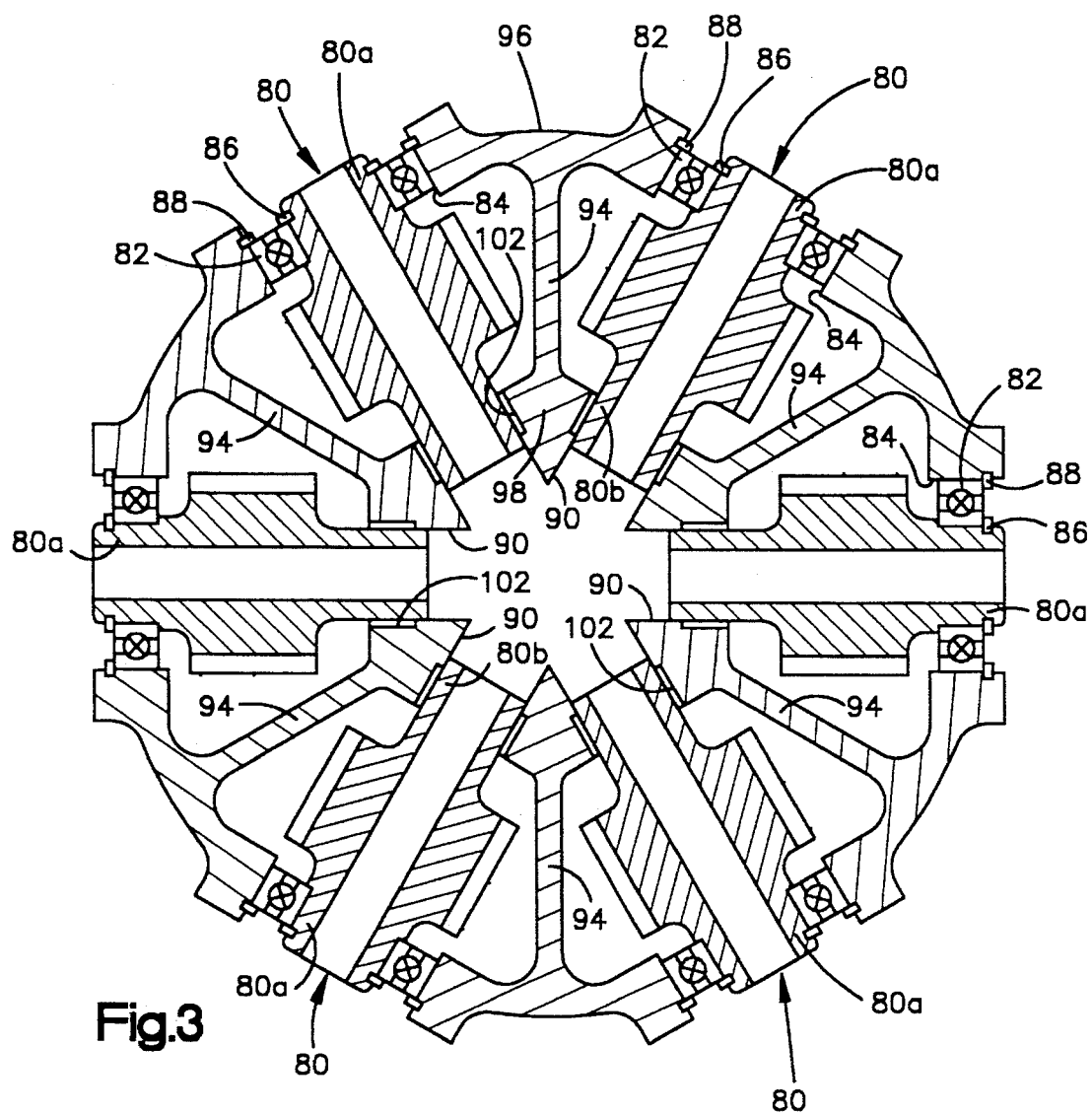
FIG. 3 is a fragmentary, sectional view of a differential carrier forming part of the inter-axle differential as seen from the plane indicated by the line 3—3 in FIG. 2, with portions omitted for clarity.

Referring also to FIG. 3, the carrier 36 carries a plurality of pinions 80 which, in the preferred embodiment, comprise spur gears having an outer hub portion 80a supported by conrad-type ball bearings 82 that are carried in circular openings 84 formed in the carrier 36. An inner retaining ring 86 captures the bearing between itself and a shoulder formed on the pinion 80. An outer retaining ring 88 prevents the bearing 82 from moving radially outwardly with respect to the carrier 36. An inner hub portion 80b of each pinion gear 80 is rotatably supported in a bore 90 formed in the carrier 36.

If the carrier 36 is formed from a casting, radial web sections 94 extend from an outer wall 96 and connect to a central bore-defining portion 98. As seen in FIG. 2, the inner shaft portions 80b may be rotatably supported by sleeve bearings 100 which are mounted in counter bores 102 formed in the central bore-defining portion 98 of the carrier 36.

As seen in FIG. 2, the spur gear pinions co-engage the left and right side gears 32, 34 (as viewed in FIG. 2). Rotation of the ring gear 30 by the output gear 24 produces rotation in the carrier 36 which produces an orbit-like motion in the pinions 80. Orbiting of the pinions produces concurrent rotation in the side gears 32, 34.

In the embodiment illustrated in FIG. 2, the side gears 32, 34 have different diameters and, therefore, the torque split between the front and rear stub shafts 50, 52 to which the side gears are connected will not be equal. The torque split is determined by the ratio of the number of gear teeth on the side gear 32 as compared to the side gear 34.

Thrust washers 110, 112 are positioned between the side gears 32, 34 and the carrier 36. The thrust washers provide reaction surfaces for the expected gear reaction forces generated between the teeth of the side gears and the teeth of the pinion gears during torque transfer. In the disclosed embodiment the thrust washers or bearings 110, 112 are secured to the carrier 36 by threaded fasteners 114 (only one is shown in FIG. 2) in order to inhibit relative rotation between the carrier and the thrust bearings 110, 112. In this disclosed embodiment, the side gears 32, 34 include hardened wear surfaces 32b, 34b against which the thrust bearings 110, 112 ride. The thrust washers 110, 112 are considered wear items and can be replaced if necessary.

According to a feature of the invention, the thrust washers 110, 112 may be constructed of a friction material so that gear reaction forces generated during differentiation causes torque to be directly transferred to the carrier 36 due to the friction generated between the side gears 32, 34 and the carrier 36. This torque transfer tends to limit the amount of relative motion/slip between the side gears and the carrier 36.

With the disclosed embodiment, the torque split between front and rear axles can be easily modified by changing one or both side gears 32, 34. If an equal torque split is desired, side gears having the same diameter are installed in the differential. If an unequal torque split is desired, side gears having dissimilar diameters such as those shown in FIG. 2 are installed. The ratio of the number of gear teeth on the side gears determines the torque split. Because the side gears 32, 34 comprise face gears, the pinion gears 80 need not be changed to modify the torque split provided by the differential.

Figure 4:
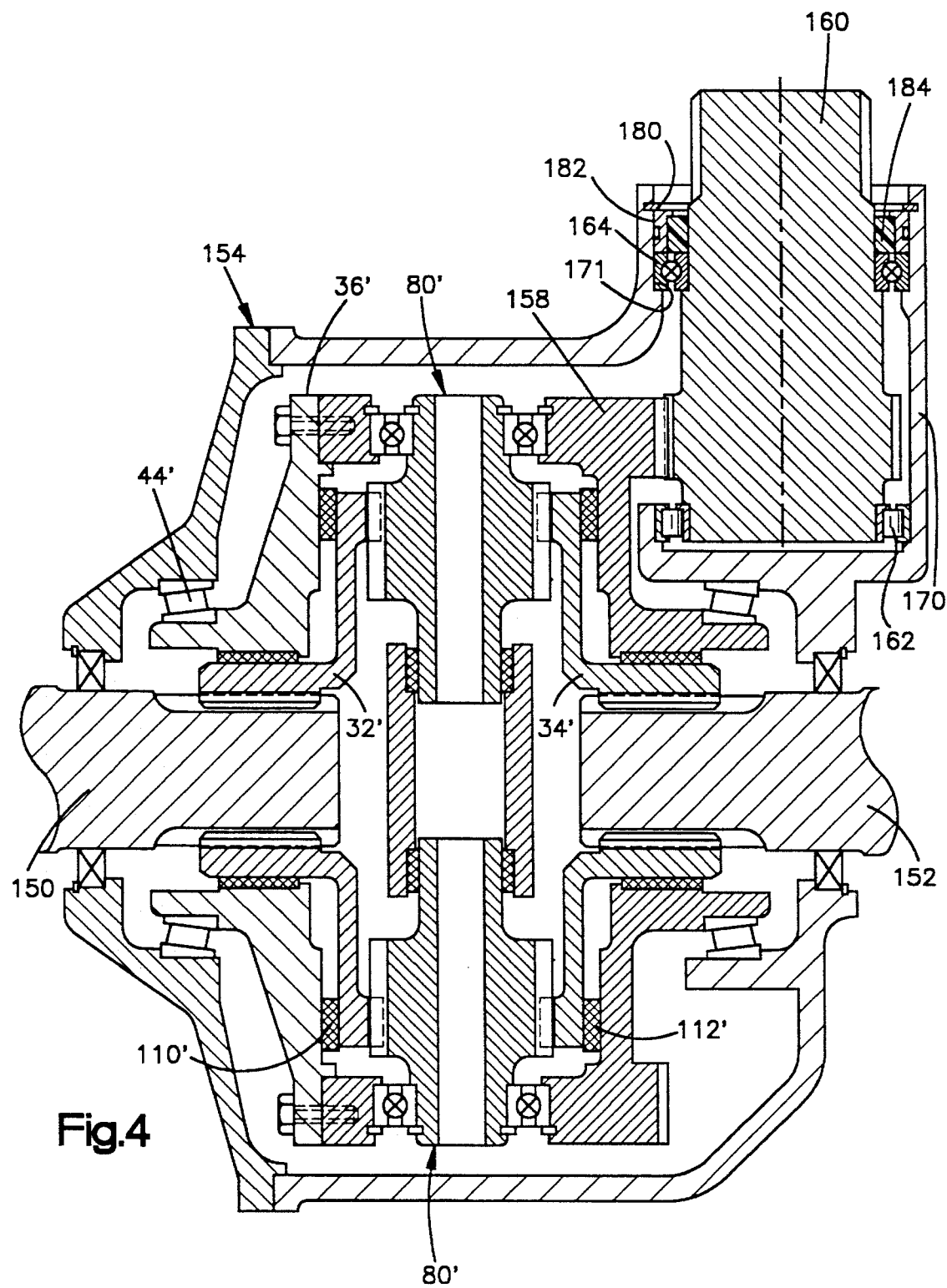
FIG. 4 is a sectional view of an axle differential constructed in accordance with the preferred embodiment of the invention which is operative to split torque between left and right drive axles.

FIG. 4 illustrates an axle differential constructed in accordance with the preferred embodiment of the invention which operates to split torque between left and right drive axles 150, 152. To facilitate the explanation, like parts will be accorded the same reference characters followed by an apostrophe as the components in FIGS. 1–3. The differential carrier 36' is rotatably carried within an axle housing 154 by a pair of roller bearing assemblies 44'. In this embodiment, the carrier 36 includes an integral ring gear 158 which is preferably formed as a face-type gear. Rotation of the carrier is imparted by a spur-type input gear 160 which is rotatably supported by a roller bearing assembly 162 and a conrad-type ball bearing assembly 164. As is known, the input gear 160 is coupled to a vehicle engine, typically by an elongate drive shaft (not shown).

In this embodiment, a 50/50 torque split between left and right axles 150, 152 is desired and, therefore, the side gears 32', 34' are equal in diameter and contain the same number of gear teeth. Again, thrust washers 110', 112' provide reaction surfaces for the side gears and support the separation forces that are generated between the side gears 32', 34' and the pinion gears 80' during torque transfer. If the thrust washers are made from a friction-type material, a "limited slip-type" differential is produced wherein the gear separation forces produce a torque that is transmitted to the carrier 36 by the thrust washers 110', 112'.

According to a feature of the invention, the overall ratio for the differential is determined by the number of gear teeth on the input pinion shaft 160. In many bevel gear-type differentials, hypoid gears are used for the pinion and ring gears. As in known in the art, the relative position between the pinion and ring gear are critical when hypoid gears are used. If improperly positioned, noise and/or premature wear will occur.

The input pinion gear 160, illustrated in FIG. 4, does not require critical positioning since the coupling between the input gear 160 and the ring gear 158 is provided by face gear teeth and spur gear teeth. As a result, the axial position of the input pinion gear 160 with respect to the ring gear 158 is not critical.

In the illustrated embodiment, the input pinion 160 is rotatably supported within a pinion housing 170 forming part of the overall axle housing 154. The position of the pinion 160 within the pinion housing 170 is maintained by the upper ball bearing 164 which is held against a shoulder 171 formed in the pinion housing by a retaining ring 180 and intermediate spacer 182. An oil seal 184 is used to inhibit fluid leakage out of the housing 154.

Returning to FIG. 3, as described above, the illustrated carrier 36 mounts a plurality of pinions 80. In the exemplary embodiment, six pinions 80 are mounted in the carrier 36. The number of pinions determines the torque capacity of the differential. If maximum torque capacity is desired, all six pinions 80 are mounted within the carrier 36. If a lower capacity differential is desired, a reduced number of pinions 80 are used. For example, for very light duty differential applications, only two pinions need to be mounted in the carrier 36. With the disclosed differential, the torque capacity of a given differential can be easily modified by adjusting the number of pinions 80 mounted within the carrier 36.

Figure 5:
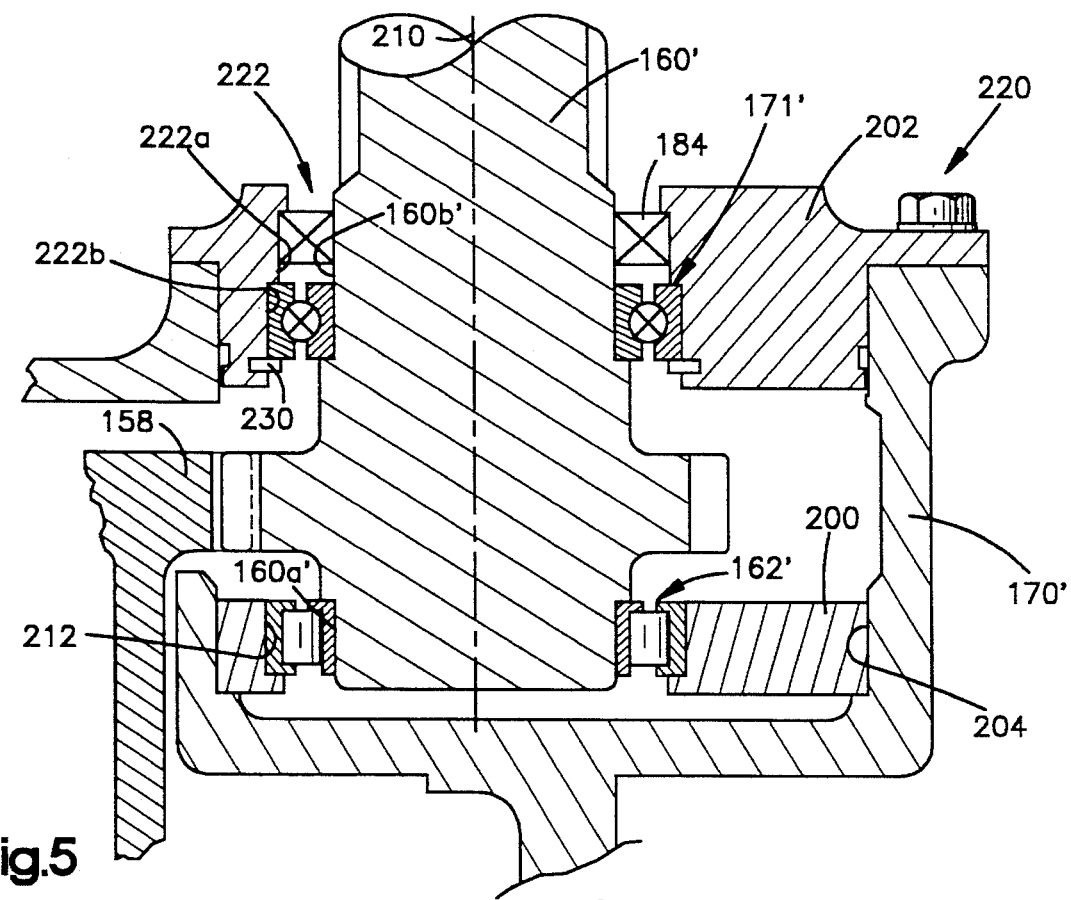
FIG. 5 is a fragmentary, sectional view of a pinion housing, rotatably supporting an input pinion gear, constructed in accordance with a preferred embodiment of the invention; and, FIG. 6 is a fragmentary, sectional view of the pinion housing showing an alternately sized pinion gear mounted within the housing.
Figure 6:
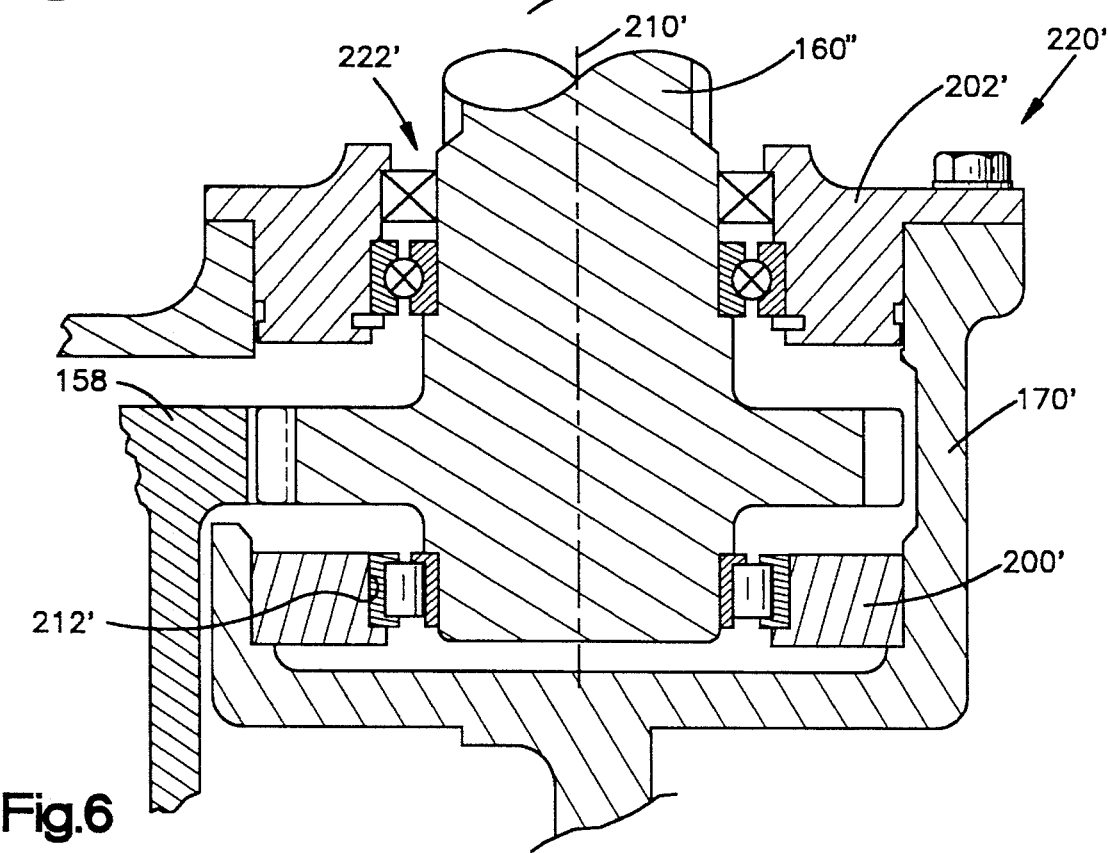

According to a feature of the invention, the overall ratio of the differential can be changed by replacing the input pinion gear 160 with one having a different diameter. Referring to FIGS. 5 and 6, an alternate construction for the pinion housing 170 is illustrated. For purposes of explanation, like parts will be given the same reference character followed by an apostrophe. In the alternate construction, a pinion 160' is rotatably mounted within the pinion housing 170' by spaced part roller and ball bearing assemblies 162' and 171', respectively. However, in the alternate construction, the roller and ball bearing assemblies are held in an adapter and associated bearing cap 200, 202, respectively. In particular, an adaptor ring 200 is held in a circular recess 204 defined by the pinion housing 170'. The adaptor 200 defines a counter bore 212, the centerline of which defines a rotational axis 210 of the pinion 160'. The position of the bore 212 within the adaptor 200 is selected to provide the proper spacing between the pinion 160' and the ring gear 158. The counter bore 212 receives the outer race of the roller bearing 162'. The inner race of the roller bearing 162' is received by a reduced diameter portion 160a' defined by the pinion 160'.

The bearing cap 202 is held to the pinion housing 170' by a plurality of bolts 220 (only one of which is shown). The bearing cap 202 defines a multi-step bore indicated generally by the reference character 222. When the bearing cap 202 is mounted to the pinion housing 170'. The centerline of the bore 222 is aligned with the bore 212 formed in the adaptor 200. One step 222a of the bore 222 mounts an oil seal 184'. A second step 222b of the multi-step bore 222 receives the outer race of the ball bearing 171'. The outer race is held in position against a shoulder formed between the step portions 222a, 222b by a retaining ring 230. The inner race of the ball bearing 171' is received by a reduced diameter portion 160b' defined on the pinion 160'. Since the outer race is locked in position by the retaining ring 230, the position of the pinion 160' within the pinion housing 170' is maintained.

To change the overall ratio of the differential, the pinion 160' along with its associated adaptor 200 and bearing cap 202 is replaced with one having a different centerline of rotation. FIG. 6 illustrates the mounting of an alternately sized pinion 160". As seen in FIG. 6, the larger diameter pinion 160" is mounted in the same pinion housing 170'. In order to mount the pinion 160" in the pinion housing 170', an adaptor 200', defining a bore 212' with a centerline different from the centerline defined by the bore 212' in the adaptor 200 shown in FIG. 5, is mounted in the housing 170'. Similarly, the bearing cap 202' defines a multi-step bore 222' which has a centerline different from the centerline defined by the multi-step bore 222 in FIG. 5. The centerlines defined by the alternate adaptor 200' and bearing cap 202' correspond to the rotational axis 210' of the alternate pinion 160".

It should be apparent the overall ratio of a differential constructed in accordance with the present invention can be easily changed by changing the input pinion 160 and associated adaptor 200 and bearing cap 202. The rest of the differential remains unchanged and unaffected. With the disclosed invention, changes in the differential gear ratio can be effected during manufacture, as well as in the field.

Although the invention has been described with a certain degree of particularity, it should be understood that those skilled in the art can make various changes to it without departing from the spirit or scope of the invention as hereinafter claimed.

I claim:

1. An inter-axle differential mechanism, comprising:

a) a differential carrier defining a rotational axis about which said differential carrier rotates;

b) means for imparting rotation to said differential carrier about said rotational axis;

c) said differential carrier rotatably mounting first and second side gears, said first and second side gears being unequal diameters and positioned in a spaced apart, confronting relationship;

d) said first and second side gears each defining peripheral, face type gear teeth, the number of gear teeth defined by said first side gear being different from the number of gear teeth defined by said second side gear; and, e) a plurality of pinion gears rotatably carried by said carrier and positioned such that said pinion gears rotate about axes that extend radially from the axis of rotation of said carrier;

f) each of said pinion gears defining an equal number of spur gear teeth and each of said pinion gears being in co-meshing relationship with said spaced apart first and second side gears.

2. The mechanism of claim 1, wherein said carrier defines a ring gear operatively engaged by an input gear such that rotation in said input gear produces attendant rotation in said carrier about said rotational axis.

3. The apparatus of claim 1, wherein said carrier rotatably mounts two spur-type pinion gears.

4. The apparatus of claim 1, wherein said differential carrier rotatably mounts six spur-type pinion gears.

5. The apparatus of claim 1, wherein radially outer shaft ends of each pinion gear are rotatably supported by a bearing assembly carried by said carrier and radially inner shaft ends of each pinion gear are rotatably supported by bushings mounted in said carrier.

6. The mechanism of claim 1 further comprising thrust bearing means disposed between said first and second side gears and said carrier and operative to support thrust loads created by gear reaction forces generated between said pinion gears and said first and second side gears.

7. The differential mechanism of claim 6, wherein said thrust bearing means comprises friction discs operative to transfer torque between said side gears and said differential carrier to provide limited slip capability for said differential mechanism.

8. The differential of claim 6, wherein said thrust bearing means comprises thrust washers secured to said carrier, said thrust washers being in abutting co-engagement with said carrier and each of said side gears.

* * * * *